US012749742B2

(12) United States Patent
Xiao et al.

(10) Patent No.: US 12,749,742 B2
(45) Date of Patent: Sep. 29, 2026

(54) BATTERY SHELL ASSEMBLY AND LITHIUM-ION BATTERY

(71) Applicant: Eve Power Co., Ltd., Jingmen (CN)

(72) Inventors: Tianli Xiao, Jingmen (CN); Shangyi Li, Jingmen (CN); Wen Chen, Jingmen (CN)

(73) Assignee: Eve Power Co., Ltd., Jingmen (CN)

( * ) Notice: Subject to any disclaimer, the term of this patent is extended or adjusted under 35 U.S.C. 154(b) by 573 days.

(21) Appl. No.: 18/274,739

(22) PCT Filed: May 25, 2023

(86) PCT No.: PCT/CN2023/096162
§ 371 (c)(1),
(2) Date: Jul. 28, 2023

(87) PCT Pub. No.: WO2024/221522
PCT Pub. Date: Oct. 31, 2024

(65) Prior Publication Data

US 2025/0201975 A1 Jun. 19, 2025

(30) Foreign Application Priority Data

Apr. 24, 2023 (CN) ......................... 202320948952.0

(51) Int. Cl.
*H01M 50/107* (2021.01)
*H01M 10/0525* (2010.01)
(Continued)

(52) U.S. Cl.
CPC ..... *H01M 50/107* (2021.01); *H01M 10/0525* (2013.01); *H01M 50/152* (2021.01);
(Continued)

(58) Field of Classification Search
CPC ............. H01M 50/107; H01M 50/179; H01M 50/528; H01M 50/545; H01M 50/593;
(Continued)

(56) References Cited

U.S. PATENT DOCUMENTS

2004/0023107 A1 2/2004 Nakanishi et al.

FOREIGN PATENT DOCUMENTS

CN 216563466 U 5/2022
CN 216720089 U 6/2022
(Continued)

OTHER PUBLICATIONS

International Search Report in International application No. PCT/CN2023/096162, mailed on Jan. 10, 2024.
(Continued)

*Primary Examiner* — Sarah A. Slifka

(57) ABSTRACT

The present disclosure provide a battery shell assembly and a lithium-ion battery. The battery shell assembly includes a shell, a pole and a connection terminal. The shell is formed with an accommodating cavity. The pole is disposed at the first end of the shell and is insulatively connected to the shell. The connection terminal is disposed on one side of the pole away from the shell. The connection terminal has a first welding portion and a second welding portion. The second welding portion is protrudingly disposed on one side of the first welding portion away from the pole. The first welding portion is electrically connected with the pole. The second welding portion is disposed to be electrically connected with an external circuit.

19 Claims, 4 Drawing Sheets

(51) Int. Cl.
*H01M 50/152* (2021.01)
*H01M 50/169* (2021.01)
*H01M 50/559* (2021.01)
*H01M 50/566* (2021.01)

(52) U.S. Cl.
CPC ....... *H01M 50/169* (2021.01); *H01M 50/559* (2021.01); *H01M 50/566* (2021.01)

(58) Field of Classification Search
CPC ............. H01M 50/559; H01M 50/152; H01M 50/169; H01M 50/566
See application file for complete search history.

(56) References Cited

FOREIGN PATENT DOCUMENTS

| | | | |
|---|---|---|---|
| CN | 216958453 | U | 7/2022 |
| CN | 218602700 | U | 3/2023 |
| CN | 219371290 | U | 7/2023 |
| CN | 219498121 | U | 8/2023 |
| EP | 4421953 | A1 | 8/2024 |

OTHER PUBLICATIONS

Written Opinion of the International Search Authority in International application No. PCT/CN2023/096162, mailed on Jan. 10, 2024.
European Office Action issued in corresponding European Patent Application No. 23736222.3 dated Jun. 30, 2025, pp. 1-10.

BATTERY SHELL ASSEMBLY AND LITHIUM-ION BATTERY

RELATED APPLICATIONS

This application is a National Phase of PCT Patent Application No. PCT/CN2023/096162 having International filing date of May 25, 2023, which claims the benefit of priority of China Patent Application No. 202320948952.0 filed on Apr. 24, 2023. The contents of the above applications are all incorporated by reference as if fully set forth herein in their entirety.

The present disclosure claims priority to Chinese Patent Application No. 202320948952.0, filed on Apr. 24, 2023, the disclosure of which is incorporated herein by reference in its entirety.

TECHNICAL FIELD

The present disclosure relates to the field of batteries, and in particular, to a battery shell assembly and a lithium-ion battery.

BACKGROUND

With the rapid growth of population and the rapid development of social economy, resources and energy are becoming increasingly scarce, and environmental protection has been paid more and more attention. The development and conservation of energy has become an important topic in the world today. Energy is the foundation of the existence and development of human society, and today's society based on mineral energy encounters energy shortage and environmental pollution crisis more and more frequently.

Meanwhile, with the advent of the information high-tech era, the application form of energy is changing, and the demand for mobile high-performance power supply, which is renewable, pollution-free, small and discrete, is growing rapidly. As a novel secondary battery, cylindrical lithium-ion battery has advantages such as high energy density and power density, high operating voltage, light weight, small size, long cycle life, good safety, environmental protection, and the like. It has a wide application prospect in portable appliances, electric tools, large-scale energy storage, electric traffic power supply, and the like. Lithium-ion batteries are usually assembled by welding to realize the conduction of internal core circuits.

However, the battery shell assembly in the related arts cannot provide effective welding areas to connect with external circuit structures, such as bars, after completing the connection with the internal core, resulting in poor welding quality between the battery shell assembly and the external circuits, which is not conducive to the assembly and use of lithium-ion batteries.

SUMMARY OF INVENTION

The present disclosure provide a battery shell assembly and a lithium-ion battery, which can solve a problem of poor welding quality between the battery shell assembly and an external circuit.

For this purpose, the present disclosure adopts the following technical solutions:

In a first aspect, an embodiment of the present disclosure provides a battery shell assembly including:

a shell formed with an accommodating cavity, the accommodating cavity being configured to place a core; the shell having a first end and a second end that are opposite to each other, and the first end being provided with an opening communicating with the accommodating cavity;

a pole located at the first end of the shell, the pole being insulatively connected to the shell, and one side of the pole facing the accommodating cavity being disposed to be electrically connected with the core; and a connection terminal disposed on one side of the pole away from the shell, the connection terminal having a first welding portion and a second welding portion connected to each other, the second welding portion being protrudingly disposed on one side of the first welding portion away from the pole; the first welding portion being electrically connected with the pole, and the second welding portion being configured to be electrically connected with an external circuit.

In a second aspect, an embodiment of the present disclosure provides a lithium-ion battery including:

the battery shell assembly according to the above;

a core located within an accommodating cavity of the battery shell assembly, wherein the core has a first electrode electrically connected to a pole of the battery shell assembly, and a second electrode electrically connected to a shell of the battery shell assembly.

Advantageous Effects

Advantageous effects of the present disclosure:

In embodiments of the present disclosure, a battery shell assembly includes a shell, a pole and a connection terminal. The shell is formed with an accommodating cavity, and the an accommodating cavity is configured to place a core. The shell has a first end and a second end that are opposite to each other, and the first end is provided with an opening communicating with the accommodating cavity. The pole is located at the first end of the shell, and the pole is insulatively connected to the shell. One side of the pole facing the accommodating cavity is disposed to be electrically connected with the core. The connection terminal is disposed on one side of the pole away from the shell. The connection terminal has a first welding portion and a second welding portion connected to each other, wherein the second welding portion is protrudingly disposed on one side of the first welding portion away from the pole, the first welding portion is electrically connected with the pole, and the second welding portion is configured to be electrically connected with an external circuit. In the present disclosure, the first welding portion and the second welding portion are provided at the connection terminal, the first welding portion is electrically connected with the pole, the second welding portion is electrically connected with an external circuit, so as to realize the conduction between a battery and an external circuit. Meanwhile, the second welding portion protrudes from the first welding portion, so that the welding between the second welding portion and the external circuit will not be affected after the first welding portion and the pole are welded, thereby improving the welding reliability and welding efficiency of the connecting terminal and the external circuit.

LIST OF REFERENCE NUMBERS

- 10, a lithium-ion battery;
- 100, battery shell assembly; 110, shell; 111, accommodating cavity; 112, first end; 113, second end; 114, opening; 120, pole; 121, second welding area; 122, positioning groove; 123, first connecting portion; 124, second connecting portion; 130, connection terminal; 131, first welding portion; 132, first welding area; 133, second welding portion; 134, positioning portion; 140, first insulating member; 150, second insulating member; 160, pressing block;
- 200, core.

EMBODIMENTS OF INVENTION

In the description of the present disclosure, unless otherwise expressly specified and limited, the terms "connected", "connecting" are to be construed in a broad sense, for example, as fixed connected, detachably connected, mechanically connected, electrically connection, directly connected or indirectly connected via an intermediary; or internally connection of two components or interaction relationship between two components. For those of ordinary skill in the art, specific meanings of the preceding terms in the present disclosure may be construed based on specific situations.

In the present disclosure, unless otherwise expressly specified and limited, when a first feature is described as "above" or "below" a second feature, the first feature and the second feature may be in direct contact, or be in contact via another feature between the two features. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature or the first feature is obliquely under, below or underneath the second feature, or the first feature is simply at a lower level than the second feature.

Embodiments of the present disclosure provide a battery shell assembly and a lithium-ion battery, which are described in detail below. It should be noted that the order in which the following embodiments are described is not intended to limit the preferred order of the embodiments.

Figure 1:
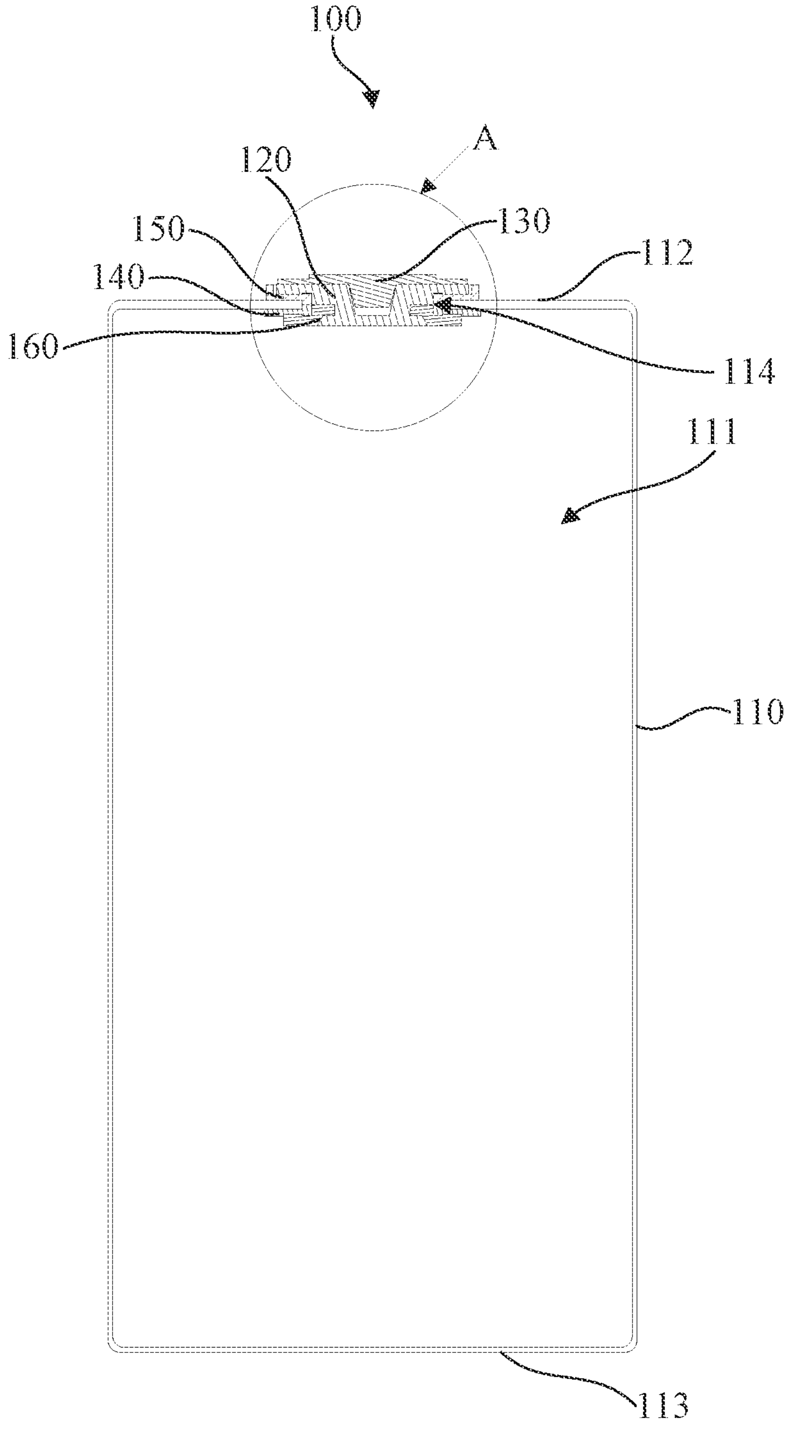
FIG. 1 is a schematic structural diagram of a battery shell assembly according to an embodiment of the present disclosure.

Firstly, an embodiment of the present disclosure provides a battery shell assembly and a lithium-ion battery. As shown in FIG. 1, the battery shell assembly 100 includes a shell 110, which is formed with an accommodating cavity 111 configured to place a core 200. The shell 110 has a first end 112 and a second end 113 that are opposite to each other, wherein the first end 112 is provided with an opening 114 communicating with the accommodating cavity 111. The shell 110 includes a shell main body and a cover plate, and an opening 114 is provided on the cover plate, wherein the cover plate and the shell main body are welded to form the shell 110 containing the core 200 and the electrolyte.

The battery shell assembly 100 includes a pole 120 located at a first end 112 of the shell 110, the pole 120 is insulatively connected to the shell 110, and one side of the pole 120 facing the accommodating cavity 111 is disposed to be electrically with the core 200. That is, the pole 120 serves as an output terminal of the core 200 for conducting the core 200 with an external circuit. Since the pole 120 is insulatively connected to the shell 110, if one electrode of the core 200 is electrically connected to the pole 120 and the other electrode is directly electrically connected to the shell 110, so that positive electrode and negative electrode of the core 200 are located on the same side of the battery shell assembly 100.

Figure 2:
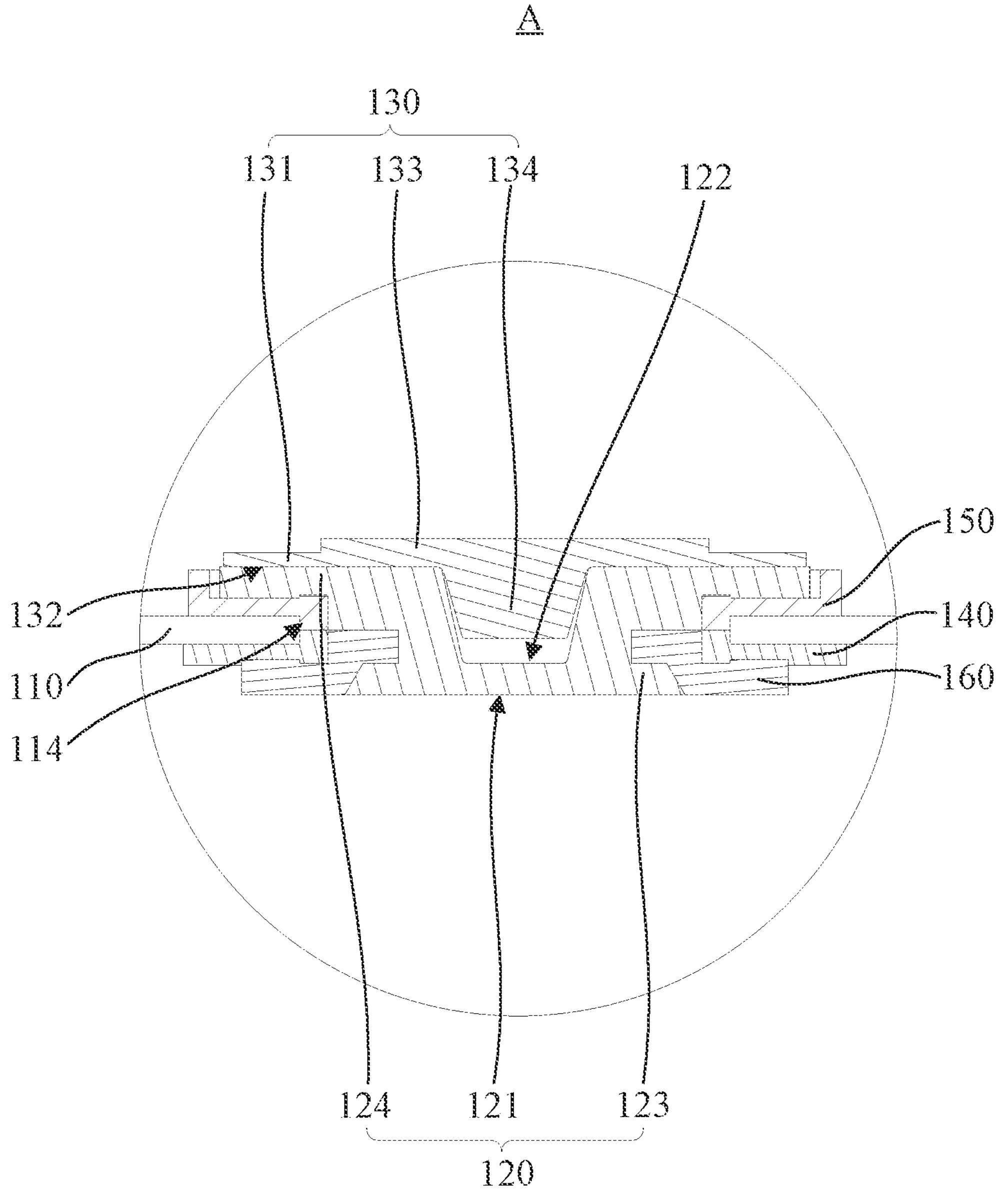
FIG. 2 is an enlarged structural diagram of area A in FIG. 1 according to an embodiment of the present disclosure.
Figure 3:
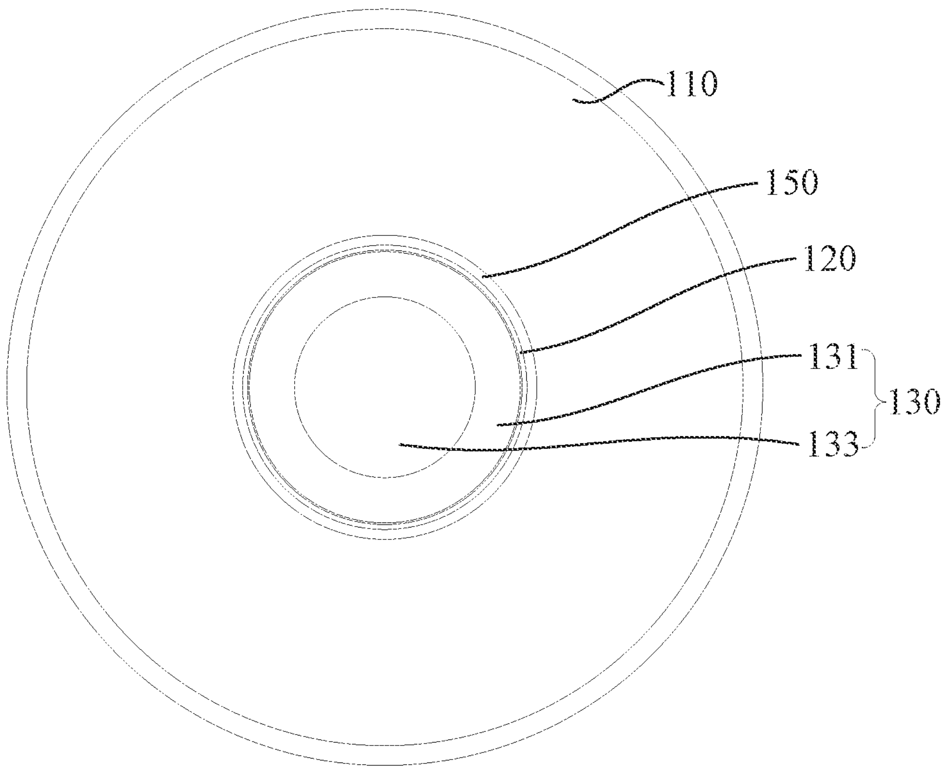
FIG. 3 is a top view of area A in FIG. 1 according to an embodiment of the present disclosure.

As shown in FIGS. 2 and 3, the battery shell assembly 100 includes a connection terminal 130 disposed on one side of the pole 120 away from the shell 110. The connection terminal 130 has a first welding portion 131 and a second welding portion 133 connected to each other, wherein the second welding portion 133 is protrudingly disposed on one side of the first welding portion 131 away from the pole 120, the first welding portion 131 is electrically connected with the pole 120, and the second welding portion 133 is configured to be electrically connected with an external circuit. Since the pole 120 is electrically connected with the core 200, the connection between the core 200 and an external circuit can be realized by electrically connecting the first welding portion 131 with the pole 120, and electrically connecting the second welding portion 133 with an external circuit. Meanwhile, the second welding portion protrudes from the first welding portion, so that a stepped structure is formed between the second welding portion 133 and the first welding portion 131, thus the welding between the second welding portion 133 and the external circuit will not be affected after the first welding portion 131 and the pole are welded, thereby improving the welding reliability and welding efficiency of the connecting terminal 130 and the external circuit.

The battery shell assembly 100 provided in embodiments of the present disclosure includes a shell 110, a pole 120 and a connection terminal 130. The shell 110 is formed with an accommodating cavity 111 which is configured to place a core 200. The shell 110 has a first end 112 and a second end 113 that are opposite to each other, wherein the first end 112 is provided with an opening 114 communicating with the accommodating cavity 111. The pole 120 is located at the first end 112 of the shell 110. The pole 120 is insulatively connected to the shell 110, and one side of the pole 120 facing the accommodating cavity 111 is disposed to be electrically connected with the core 200. The connection terminal 130 is located on the side of the pole 120 away from the shell 110. The connection terminal 130 has a first welding portion 131 and a second welding portion 133 connected to each other, wherein the second welding portion 133 is protrudingly disposed on one side of the first welding portion 131 away from the pole 120, the first welding portion 131 is electrically connected with the pole 120, and the second welding portion 133 is disposed to be electrically connected with an external circuit. In the present disclosure, the first welding portion 131 and the second welding portion 133 are provided at the connection terminal 130, the first welding portion 131 is electrically connected with the pole 120, the second welding portion 133 is electrically connected with an external circuit, so as to realize the conduction between a battery and an external circuit. Meanwhile, the second welding portion 133 protrudes from the first welding portion 131, so that the welding between the second welding portion 133 and the external circuit will not be affected after the first welding portion 131 and the pole 120 are welded, thereby improving the welding reliability and welding efficiency of the connecting terminal and the external circuit.

Optionally, one side of the first welding portion 131 facing the pole 120 has a first welding area 132 configured to be electrically connected with the pole 120, and the first welding area 132 is disposed around an edge of the second welding portion 133. That is, the second welding portion 133 is located in an area close to the middle of the first welding portion 131. It also means that the entire edge area of the connection terminal 130 is used for electrical connection with the pole 120, and the middle area is used for electrical connection with an external circuit, such as a bar. This kind of structural design makes the welding between the connection terminal 130 and the internal structure (pole 120) and the welding between the connection terminal 130 and the external structure (bar) do not interfere with each other, it also helps the positioning of the connection terminal 130 and other structures such as a bar during welding, thus improving the welding stability and efficiency. This structure is designed so that the welding of the connection terminal 130 to the inner structure (pole 120) and the welding of an external structure (a bar) do not interfere with each other, and the positioning of the connection terminal 130 to the structure such as the bar is facilitated, thereby improving the welding stability and welding efficiency.

An orthographic projection of the second welding portion 133 on the shell 110 covers the opening 14. When designing the overall structure of the battery shell assembly 100, the opening 114 can be designed in the middle of the first end 112 of the shell 110 to facilitate the electrical connection with the core 200 in the accommodating cavity 111. The orthographic projection of the second welding portion 133 on the shell 110 is set to cover the opening 114, so that the second welding portion 133 can also be located in the middle of the whole battery shell assembly 100, which is helpful for the positioning of an external structure such as a bar with the connection terminal 130, thus improving the welding efficiency.

In some embodiments, a difference in height between the side of the first welding portion 131 away from the pole 120 and one side of the second welding portion 133 away from the pole 120 is greater than or equal to 0.4 mm and less than or equal to 0.8 mm. That is, the thickness of the second welding portion 133 is greater than or equal to 0.4 mm and less than or equal to 0.8 mm. Since the second welding portion 133 protrudes from the first welding portion 131, and the welding area of the first welding portion 131 is disposed around the edge of the second welding portion 133, if the thickness of the second welding portion 133 is too small, the welding pattern formed after the first welding portion 131 is connected with the pole 120 in the first welding area 132 may protrude from the side of the second welding portion 133 away from the pole 120, thus affecting the effective welding between an external structure such as a bar and the second welding portion 133. If the thickness of the second welding portion 133 is too large, it will cause the overall height of the battery shell assembly 100 to be too large, causing the volume proportion of the battery shell assembly 100 to be too large, which is not conducive to the high energy density design of the lithium-ion battery 10.

Specifically, in actual manufacturing process, the difference in height between the side of the first welding portion 131 away from the pole 120 and one side of the second welding portion 133 away from the pole 120 can be set to 0.4 mm, 0.5 mm, 0.6 mm, 0.7 mm, 0.8 mm, or the like, and the specific value can be adjusted according to actual use requirements, it is only necessary to ensure the effective welding between the second welding portion 133 and an external structure such as a bar and reduce the volume proportion of the whole battery shell assembly 100, which is not particularly limited herein.

In other embodiments, the thickness of the first welding portion 131 is greater than or equal to 0.3 mm and less than or equal to 0.6 mm. The first welding portion 131 is mainly welded to the pole 120 through the first welding area 132. If the thickness of the first welding portion 131 is too small, the internal resistance of the first welding portion 131 will be too large. If the thickness of the first welding portion 131 is too large, the thickness of laser penetration during welding will increase, and the required laser energy will also increase, which will increase the manufacturing cost and meanwhile affect the welding quality.

Specifically, in actual manufacturing process, the thickness of the first welding portion 131 can be set to 0.3 mm, 0.4 mm, 0.5 mm, or 0.6 mm. The specific value of the first welding portion 131 can be adjusted according to actual use requirements, it is only necessary to ensure the welding quality between the first welding portion 131 and the pole 120 while the internal resistance of the first welding part 131 is appropriate, which is not particularly limited herein.

It should be noted that the first welding portion 131 and the second welding portion 133 in embodiments of the present disclosure are integrally formed. That is, the first welding portion 131 and the second welding portion 133 are a whole, and the whole is in a stepped structure. This stepped structure enables the connection terminal 130 to be welded to the pole 120 through the first welding area 132 of the outer ring, and welded to an external structure such as a bar through the second welding portion 133 in the middle, which can realize the connection between the core 200 and an external structure while avoiding interference between each other during welding, thereby improving the stability of welding. In addition, this stepped structure is also helpful for rapid positioning of an external structure such as a bar with the connection terminal 130 during welding, thereby improving the welding efficiency.

Optionally, the side of the pole 120 facing the accommodating cavity 111 has a second welding area 121 disposed to be electrically connected with the core 200. The second welding area 121 is disposed corresponding to the second welding portion 133. An orthographic projection of the second welding portion 133 on the shell 110 covers an orthographic projection of the second welding area 121 on the shell 110. Since the pole 120 is welded to the first welding area 132 of the first welding portion 131, the first welding area 132 is provided around the second welding portion 133. That is, the orthographic projection of the first welding area 132 on the shell 110 is annular. The orthographic projection of the second welding portion 133 on the shell 110 is set to cover the orthographic projection of the second welding area 121 on the shell 110, so that the second welding area 121 is located in an area where the second welding portion 133 is located. That is, the orthographic projection of the second welding area 121 on the shell 110 is located in the orthographic projection of the first welding area 132 on the shell 110, so that the welding area between the pole 120 and the connection terminal 130 and the welding area between the pole 120 and the core 200 are independent from each other, so as to avoid mutual interference during welding, and further improve the welding stability of the pole 120.

In some embodiments, one side of the pole 120 away from the accommodating cavity 111 is provided with a positioning groove 122 that corresponds to the second welding area 121. The side of the first welding portion 131 facing the pole 120 is protrudingly provided with a positioning portion 134 that corresponds to the positioning groove 122. The positioning portion 134 is inserted into the positioning groove 122. That is, when the connection terminal 130 is welded to the pole 120, the positioning portion 134 of the connection terminal 130 is inserted into the positioning groove 122 in the pole 120 firstly to define the relative position of the connection terminal 130 and the pole 120, so as to realize positioning of the connection terminal 130. Then the first welding area 132 of the connection terminal 130 is laser welded to realize the electrical connection between the connection terminal 130 and the pole 120.

A side wall of the positioning groove 122 is at least partially expanding in a direction away from the accommodating cavity 111. Alternatively, the side wall of the positioning groove 122 is in the shape of an overall expanded funnel-shaped structure in the direction away from the accommodating cavity 111. That is, the cross section of the positioning groove 122 has an inverted trapezoidal structure. Correspondingly, the positioning portion 134 has a conical structure with an inverted trapezoidal cross section. This structural design enables the positioning portion 134 to slide into the positioning groove 122 along the side wall of the positioning groove 122 even if there is a deviation when inserting the positioning portion 134 into the positioning groove 122, thereby reducing the positioning accuracy between the connection terminal 130 and the pole 120.

In some embodiments, an obtuse angle is formed between the side wall of the positioning groove 122 and a bottom of the positioning groove 122, and an included angle formed between the side wall of the positioning groove 122 and the bottom of the positioning groove 122 is smaller than an included angle formed between a side wall of the positioning portion 134 and the bottom of the positioning groove 122. That is, after the positioning portion 134 of the connection terminal 130 is inserted into the positioning groove 122 of the pole 120, there is a gap present between the side wall of the positioning portion 134 and the side wall of the positioning groove 122, so as to facilitate smooth assembly of the connection terminal 130 and the pole 120.

It should be noted that after the positioning portion 134 of the connection terminal 130 is inserted into the positioning groove 122 of the pole 120, a gap can be present between the positioning portion 134 and the bottom of the positioning groove 122. That is, the positioning portion 134 abuts against the side wall of the positioning groove 122 through the side surface. By setting a gap between the positioning portion 134 and the bottom of the positioning groove 122, it is possible to prevent the connection terminal 130 and the pole 120 from being stuck during assembly, or to avoid the situation that when the positioning portion 134 of the connection terminal 130 abuts against the bottom of the positioning groove 122 of the pole 120, the first welding portion 131 of the connection terminal 130 is not in contact with the surface of the pole 120, thereby affecting the effective welding between the connection terminal 130 and the pole 120. In addition, by providing a gap between the positioning portion 134 and the bottom of the positioning groove 122, it is possible to reduce the overall weight of the battery shell assembly 100 while ensuring the effective positioning between the connection terminal 130 and the pole 120, thereby improving the energy density of the lithium-ion battery 10.

In some embodiments, the thickness of the bottom of the positioning groove 122 is greater than or equal to 0.8 mm and less than or equal to 1.5 mm. That is, the thickness of the pole 120 corresponding to the position of the second welding area 121 is greater than or equal to 0.8 mm and less than or equal to 1.5 mm. If the thickness is too small, the internal resistance of the pole 120 will be too large. If the thickness is too large, the thickness of laser penetration during welding will increase, and the required laser energy will also increase, which will increase the manufacturing cost and meanwhile affect the welding quality.

Specifically, in actual manufacturing process, the thickness of the bottom of the positioning groove 122 can be set to 0.8 mm, 1.0 mm, 1.2 mm, 1.5 mm, or the like. The specific value can be adjusted according to actual use requirements, it is only necessary to ensure the welding quality between the pole 120 and the core 200 while the internal resistance of the pole 120 is appropriate, which is not particularly limited herein.

In other embodiments, the diameter of the positioning groove 122 is greater than or equal to 2 mm and less than or equal to 5 mm. The diameter of the positioning groove 122 directly reflects the size of the weldable area between the pole 120 and the core 200. If the diameter of the positioning groove 122 is too small, the effective welding area between the pole 120 and the core 200 will be too small, thus affecting the welding stability between the pole 120 and the core 200. If the diameter of the positioning groove 122 is too large, the opening 114 in the shell 110 will be too large, which is not conducive to sealing of the battery shell assembly 100.

Specifically, in actual manufacturing process, the diameter of the positioning groove 122 can be set to 2 mm, 3 mm, 4 mm, 5 mm, or the like. The specific value can be adjusted according to actual use requirements, it is only necessary to ensure the welding stability between the pole 120 and the core 200 while avoiding impacts on the sealing of the battery shell assembly 100, which is not particularly limited herein.

Optionally, the pole 120 includes a first connecting portion 123 extending into the accommodating cavity 111, and a second connecting portion 124 extending out of the opening 114. The first connecting portion 123 is configured to be electrically connected with the core 200. The second connecting portion 124 is configured to be electrically connected to the first welding portion 123. The battery shell assembly 100 further includes a first insulating member 140 and a second insulating member 150. The first insulating member 140 is disposed between the first connecting portion 123 and an inner surface of the shell 110, and the second insulating member 150 is disposed between the second connecting portion 124 and an outer surface of the shell 110 to insulatively connect the pole 120 to the shell 110.

That is to say, when the pole 120 is riveted with the shell 110, the pole 120 is extended into the first connecting portion 123 of the accommodating cavity 111 through the first insulating member 140, so as to be separated from the shell 110, thus the pole 120 is insulated from the inner surface of the shell 110, and the pole 120 and the inner surface of the shell 110 are sealed as well. The second connecting portion 124 of the pole 120 extending out of the opening 114 is separated from the shell 110 through the second insulating member 150, so that the pole 120 is insulated from the outer surface of the shell 110, and the pole 120 and the outer surface of the shell 110 are sealed as well.

Further, a pressing block 160 is disposed between the first insulating member 140 and the first connecting portion 123. The pressing block 160 has a hardness greater than that of the pole 120. The sealing of the first insulating member 140 to the pole 120 and the inner surface of the shell 110 can be strengthened by riveting the first insulating member 140, the pressing block 160, and the first connecting portion 123 to each other.

Secondly, embodiments of the present disclosure further provide a lithium-ion battery including a battery shell assembly, and a specific structure of the battery shell assembly is described with reference to the foregoing embodiments. Since the lithium-ion battery adopts all the technical solutions of all the foregoing embodiments, it has at least all the beneficial effects brought by the technical solutions of the foregoing embodiments, which will not be repeated herein.

Figure 4:
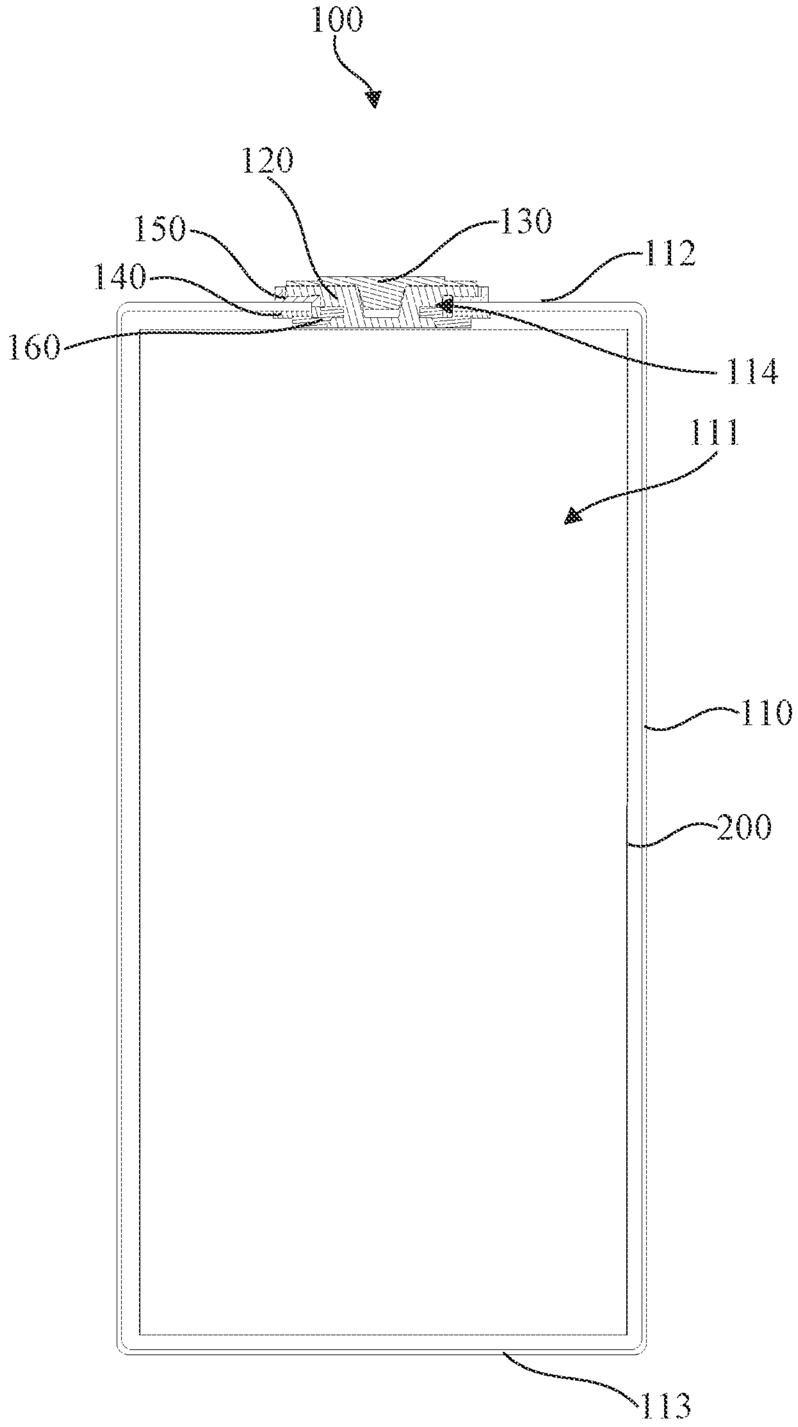
FIG. 4 is a schematic structural diagram of a lithium-ion battery according to an embodiment of the present disclosure.

As shown in FIG. 4, the lithium-ion battery 10 includes a battery shell assembly 100 and a core 200 disposed within an accommodating cavity 111 of the battery shell assembly 100. The core 200 has a first electrode and a second electrode. The first electrode is electrically connected to the pole 120 of the battery shell assembly 100, and the second electrode electrically connected to the shell 110 of the battery shell assembly 100. That is, the pole 120 and the entire shell 110 are respectively used as two output terminals of the lithium-ion battery 10, so that the positive electrode and negative electrode of the lithium-ion battery 10 are located on the same side of the battery shell assembly 100, which is convenient for the assembly of subsequent modules.

The first electrode can be a positive electrode of the core 200, and the second electrode can be a negative electrode of the core 200, so the pole 120 and the connection terminal 130 in the battery shell assembly 100 together form the positive output terminal of the lithium-ion battery 10. Correspondingly, the shell 110 is the negative output terminal of the lithium-ion battery 10.

Specifically, the battery shell assembly 100 in embodiments of the present disclosure includes a shell 110, a pole 120 and a connection terminal 130. The shell 110 is formed with an accommodating cavity 111 configured to place a core 200. The shell 110 has a first end 112 and a second end 113 that are opposite to each other. The first end 112 is provided with an opening 114 communicating with the accommodating cavity 111. The pole 120 is disposed at the first end 112 of the shell 110. The pole 120 is insulatively connected to the shell 110, and one side of the pole 120 facing the accommodating cavity 111 is disposed to be electrically connected with the core 200. The connection terminal 130 is located on the side of the pole 120 away from the shell 110. The connection terminal 130 has a first welding portion 131 and a second welding portion 133 connected to each other, wherein the second welding portion 133 is protrudingly disposed on one side of the first welding portion 131 away from the pole 120, the first welding portion 131 is electrically connected with the pole 120, and the second welding portion 133 is disposed to be electrically connected with an external circuit. In the present disclosure, the first welding portion 131 and the second welding portion 133 are provided at the connection terminal 130, the first welding portion 131 is electrically connected with the pole 120, the second welding portion 133 is electrically connected with an external circuit, so as to realize the conduction between a battery and an external circuit. Meanwhile, the second welding portion 133 protrudes from the first welding portion 131, so that the welding between the second welding portion 133 and the external circuit will not be affected after the first welding portion 131 and the pole 120 are welded, thereby improving the welding reliability and welding efficiency of the connecting terminal and the external circuit.

What is claimed is:

1. A battery shell assembly, comprising:

a shell formed with an accommodating cavity, the accommodating cavity being configured to place a core; the shell having a first end and a second end that are opposite to each other, and the first end being provided with an opening communicating with the accommodating cavity;

a pole disposed at the first end of the shell, the pole being insulatively connected to the shell, and one side of the pole facing the accommodating cavity being disposed to be electrically connected with the core; and a connection terminal disposed on one side of the pole away from the shell, the connection terminal having a first welding portion and a second welding portion connected to each other, the second welding portion being protrudingly disposed on one side of the first welding portion away from the pole; the first welding portion being electrically connected with the pole, and the second welding portion being configured to be electrically connected with an external circuit;

wherein one side of the first welding portion facing the pole has a first welding area, the first welding portion is disposed on an upper surface of the pole, and a height of an upper surface of the first welding portion is greater than a height of the first welding area and a height of the upper surface of the pole; and wherein the pole comprises a first connecting portion extending into the accommodating cavity, the battery shell assembly comprises a first insulating member, and a pressing block is disposed between the first insulating member and the first connecting portion, and the pressing block has a hardness greater than that of the pole.

2. The battery shell assembly according to claim 1, wherein the first welding area is configured to be electrically connected with the pole, and the first welding area is disposed around an edge of the second welding portion.

3. The battery shell assembly according to claim 2, wherein an orthographic projection of the second welding portion on the shell covers the opening.

4. The battery shell assembly according to claim 2, wherein a difference in height between the side of the first welding portion away from the pole and one side of the second welding portion away from the pole is greater than or equal to 0.4 mm and less than or equal to 0.8 mm.

5. The battery shell assembly according to claim 2, wherein the side of the pole facing the accommodating cavity has a second welding area disposed to be electrically connected with the core; the second welding area is disposed to correspond to the second welding portion, and an orthographic projection of the second welding portion on the shell covers an orthographic projection of the second welding area on the shell.

6. The battery shell assembly according to claim 5, wherein one side of the pole away from the accommodating cavity is provided with a positioning groove that corresponds to the second welding area, and the side of the first welding portion facing the pole is protrudingly provided with a positioning portion that corresponds to the positioning groove, and the positioning portion is inserted into the positioning groove.

7. The battery shell assembly according to claim 6, wherein a bottom of the positioning groove has a thickness of greater than or equal to 0.8 mm and less than or equal to 1.5 mm; and/or the positioning groove has a diameter of greater than or equal to 2 mm and less than or equal to 5 mm.

8. The battery shell assembly according to claim 7, wherein a side wall of the positioning groove is at least partially expanding in a direction away from the accommodating cavity.

9. The battery shell assembly according to claim 7, wherein an obtuse angle is formed between the side wall of the positioning groove and a bottom of the positioning groove, and an included angle formed between the side wall of the positioning groove and the bottom of the positioning groove is smaller than an included angle formed between a side wall of the positioning portion and the bottom of the positioning groove.

10. The battery shell assembly according to claim 7, wherein a gap is present between the positioning portion and the bottom of the positioning groove.

11. The battery shell assembly according to claim 6, wherein a side wall of the positioning groove is at least partially expanding in a direction away from the accommodating cavity.

12. The battery shell assembly according to claim 6, wherein an obtuse angle is formed between the side wall of the positioning groove and a bottom of the positioning groove, and an included angle formed between the side wall of the positioning groove and the bottom of the positioning groove is smaller than an included angle formed between a side wall of the positioning portion and the bottom of the positioning groove.

13. The battery shell assembly according to claim 6, wherein a gap is present between the positioning portion and the bottom of the positioning groove.

14. The battery shell assembly according to claim 2, wherein a second connecting portion extending out of the opening; the first connecting portion is configured to be electrically connected with the core, and the second connecting portion is configured to be electrically connected to the first welding portion; and the battery shell assembly further comprises a second insulating member, the first insulating member is disposed between the first connecting portion and an inner surface of the shell, and the second insulating member is disposed between the second connecting portion and an outer surface of the shell to insulatively connect the pole to the shell.

15. The battery shell assembly according to claim 2, wherein the first welding portion and the second welding portion are integrally formed.

16. The battery shell assembly according to claim 1, wherein the first welding portion has a thickness of greater than or equal to 0.3 mm and less than or equal to 0.6 mm.

17. The battery shell assembly according to claim 1, wherein a second connecting portion extending out of the opening; the first connecting portion is configured to be electrically connected with the core, and the second connecting portion is configured to be electrically connected to the first welding portion; and the battery shell assembly further comprises a second insulating member, the first insulating member is disposed between the first connecting portion and an inner surface of the shell, and the second insulating member is disposed between the second connecting portion and an outer surface of the shell to insulatively connect the pole to the shell.

18. The battery shell assembly according to claim 1, wherein the first welding portion and the second welding portion are integrally formed.

19. A lithium-ion battery comprising:

a battery shell assembly; and a core disposed within an accommodating cavity of the battery shell assembly, wherein the core has a first electrode electrically connected to a pole of the battery shell assembly, and a second electrode electrically connected to a shell of the battery shell assembly;

wherein the battery shell assembly comprises:

a shell formed with an accommodating cavity, the accommodating cavity is configured to place a core; the shell has a first end and a second end that are opposite to each other, and the first end is provided with an opening communicating with the accommodating cavity;

a pole disposed at the first end of the shell, the pole is insulatively connected to the shell, and one side of the pole facing the accommodating cavity is disposed to be electrically connected with the core; and a connection terminal disposed on one side of the pole away from the shell, the connection terminal has a first welding portion and a second welding portion connected to each other, the second welding portion is protrudingly disposed on one side of the first welding portion away from the pole; the first welding portion is electrically connected with the pole, and the second welding portion is configured to be electrically connected with an external circuit;

wherein one side of the first welding portion facing the pole has a first welding area, the first welding portion is disposed on an upper surface of the pole, and a height of an upper surface of the first welding portion is greater than a height of the first welding area and a height of the upper surface of the pole; and wherein the pole comprises a first connecting portion extending into the accommodating cavity, the battery shell assembly comprises a first insulating member, and a pressing block is disposed between the first insulating member and the first connecting portion, and the pressing block has a hardness greater than that of the pole.

* * * * *